(12) United States Patent
Imai (10) Patent No.: US 11,886,108 B2
(45) Date of Patent: Jan. 30, 2024

(54) BLADE DRIVING DEVICE, IMAGING DEVICE, AND ELECTRONIC DEVICE

(71) Applicant: NIDEC COPAL CORPORATION, Tokyo (JP)

(72) Inventor: Kenzo Imai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/955,548

(22) Filed: Sep. 29, 2022

(65) Prior Publication Data

US 2023/0384651 A1 Nov. 30, 2023

Related U.S. Application Data

(60) Provisional application No. 63/347,023, filed on May 31, 2022.

(51) Int. Cl.
*G03B 9/10* (2021.01)
(52) U.S. Cl.
CPC ..................................... *G03B 9/10* (2013.01)
(58) Field of Classification Search
CPC .............. G03B 9/08; G03B 9/10; G03B 9/36
See application file for complete search history.

(56) References Cited

U.S. PATENT DOCUMENTS

| 2016/0266468 A1* | 9/2016 | Niwamae | G03B 9/36 |
| 2021/0033948 A1* | 2/2021 | Ushio | G03B 11/043 |
| 2022/0091478 A1* | 3/2022 | Sawanobori | G06F 1/1686 |
| 2022/0283477 A1* | 9/2022 | Wang | G03B 9/10 |

FOREIGN PATENT DOCUMENTS

| JP | 2006189513 A | 7/2006 | |
| JP | 2022017837 A * | 1/2022 | |
| WO | WO-2013088777 A1 * | 6/2013 | G03B 9/36 |

* cited by examiner

*Primary Examiner* — Christopher E Mahoney
(74) *Attorney, Agent, or Firm* — HAUPTMAN HAM, LLP (57) ABSTRACT

A blade driving device is smaller and has fewer components. A blade driving device includes a base including a support shaft extending frontward, a cover having an opening, a blade located in a blade chamber defined between the base and the cover, and an actuator that moves the blade between a closing position to cover the opening and an opening position to uncover the opening. The cover covers a front of the base. The actuator includes a lever connected to the blade. The lever includes a lever body rotatable about the support shaft in the base, a connector connecting the lever body and the blade, and a protrusion protruding from the lever body frontward beyond the blade and facing the cover.

8 Claims, 8 Drawing Sheets

BLADE DRIVING DEVICE, IMAGING DEVICE, AND ELECTRONIC DEVICE

PRIORITY CLAIM AND CROSS-REFERENCE

This application claims priority to U.S. Provisional Application No. 63/347,023, filed May 31, 2022, the entire contents of which are hereby incorporated by reference in their entirety.

BACKGROUND

Technical Field

The present invention relates to a blade driving device, an imaging device, and an electronic device, and particularly, to a blade driving device for covering and uncovering an opening with a blade.

Description of the Background

Recent electronic devices, such as smartphones, tablet computers, laptop computers, security cameras, smart speakers, and drones, incorporate cameras. A camera incorporated in such an electronic device typically includes a blade driving device (e.g., a shutter, a barrier, and an aperture) that drives a blade for covering and uncovering or adjusting the lens aperture (refer to, for example, Patent Literature 1). Electronic devices have recently been miniaturized to incorporate a camera including a smaller blade driving device with fewer components.

CITATION LIST

Patent Literature

Patent Literature 1: Japanese Unexamined Patent Application Publication No. 2006-189513

BRIEF SUMMARY

In response to the above issue, one or more aspects of the present invention are directed to a blade driving device, an imaging device, and an electronic device that are smaller and have fewer components.

A blade driving device according to a first aspect of the present invention is smaller and has fewer components. The blade driving device includes a base including a support shaft extending frontward, a cover having an opening, a blade located in a blade chamber defined between the base and the cover, and an actuator that moves the blade between a closing position to cover the opening and an opening position to uncover the opening. The cover covers a front of the base. The actuator includes a lever connected to the blade. The lever in the actuator includes a lever body rotatable about the support shaft in the base, a connector connecting the lever body and the blade, and at least one protrusion protruding from the lever body frontward beyond the blade and facing the cover.

An imaging device according to a second aspect of the present invention is smaller and has fewer components. The imaging device includes the blade driving device described above, and an image sensor that receives light entering through the opening in the cover in the blade driving device.

An electronic device according to a third aspect of the present invention is smaller and has fewer components. The electronic device includes the imaging device described above.

DETAILED DESCRIPTION

A blade driving device according to one or more embodiments of the present invention will now be described in detail with reference to FIGS. 1 to 10. In FIGS. 1 to 10, like reference numerals denote like or corresponding components. Such components will not be described repeatedly. In FIGS. 1 to 10, the scale and dimensions of each component may be exaggerated, or one or more components may not be shown. Unless otherwise specified, the terms such as first and second will be used simply to distinguish the components and will not represent a specific order or sequence.

Figure 1:
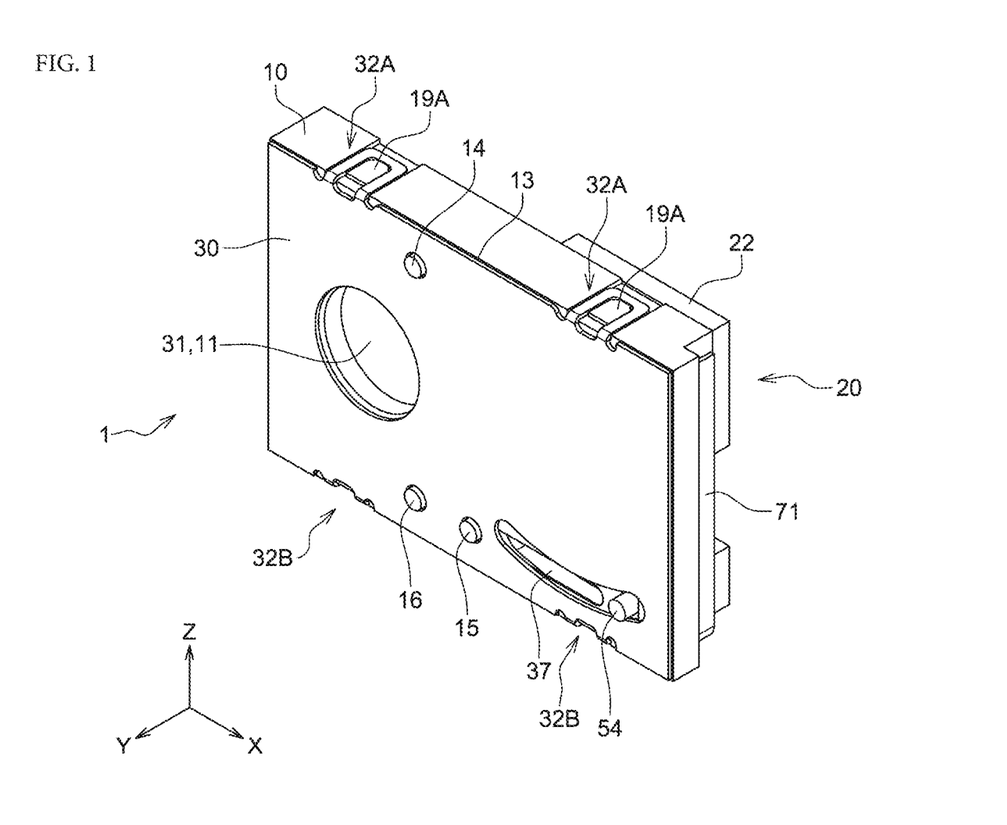
FIG. 1 is a perspective view of a blade driving device according to one embodiment of the present invention.
Figure 2:
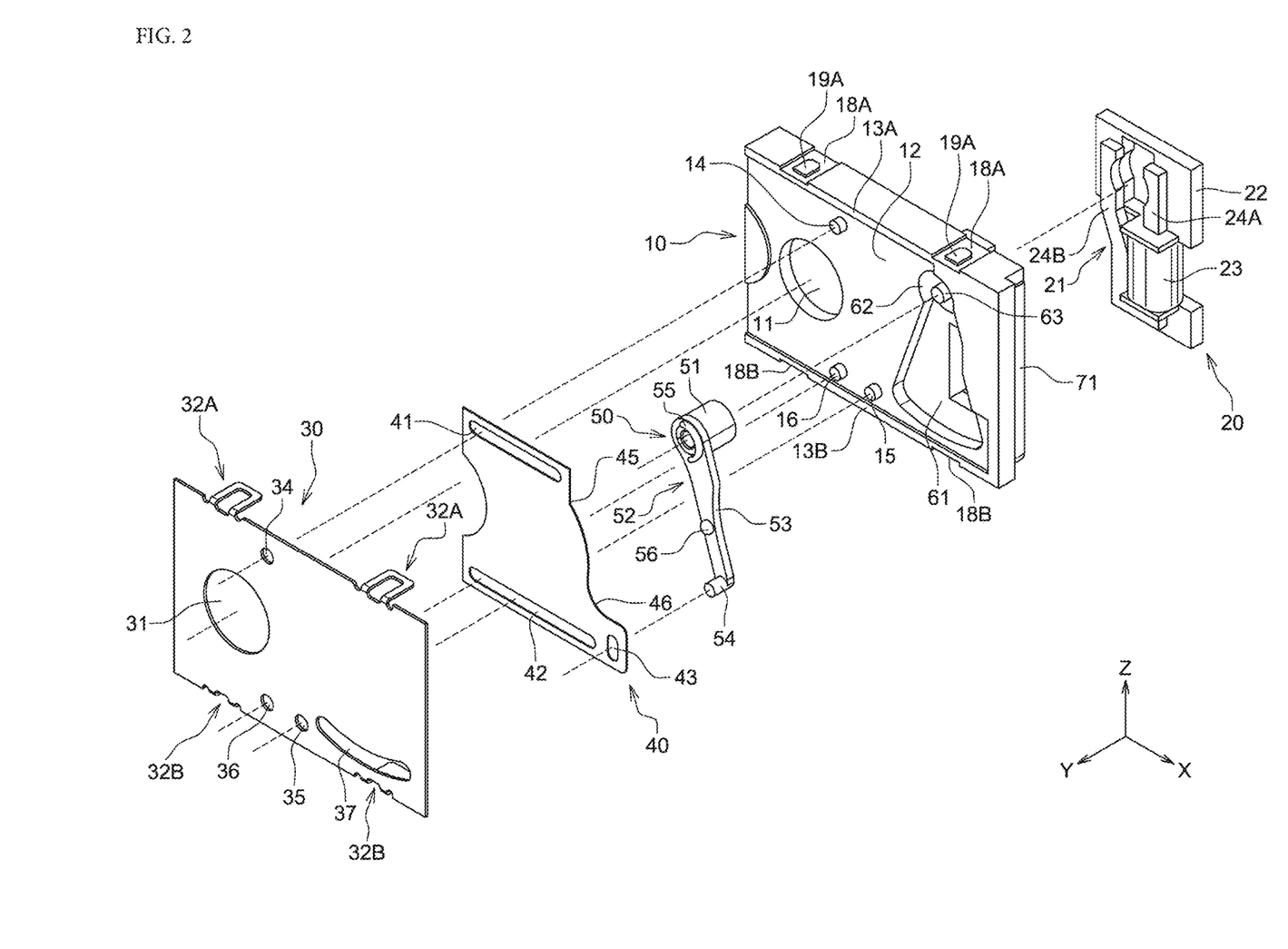
FIG. 2 is a front exploded perspective view of the blade driving device in FIG. 1.

FIG. 1 is a perspective view of a blade driving device 1 according to one embodiment of the present invention. FIG. 2 is an exploded perspective view of the blade driving device 1. As shown in FIGS. 1 and 2, the blade driving device 1 includes a base 10 being a substantially rectangular plate, a coil unit 20 attached to the rear of the base 10, a cover 30 covering the front face of the base 10, a blade 40 located in a blade chamber defined between the cover 30 and the base 10, and a lever unit 50 for driving the blade 40. For ease of explanation in the present embodiment, up or upward refers to the positive Z-direction, down or downward refers to the negative Z-direction, front or frontward refers to the positive Y-direction, and rear or rearward refers to the negative Y-direction in FIG. 1.

The base 10 has a circular opening 11 extending through the base 10 in Y-direction. The cover 30 is a substantially rectangular thin plate. The cover 30 also has a circular opening 31 having substantially the same diameter as the opening 11 in the base 10. The opening 11 in the base 10 and the opening 31 in the cover 30 are coaxial with each other. In an imaging device incorporating the blade driving device 1, light passes through the opening 31 in the cover 30 and the opening 11 in the base 10 and then enters an image sensor in the imaging device. For example, the blade 40 is formed from a material that does not transmit light to be captured by the imaging device (e.g., visible light or infrared light).

The base 10 includes a base surface 12 defining the blade chamber between the base surface 12 and the cover 30, edges 13A and 13B respectively extending from an upper portion and a lower portion of the base surface 12 in the positive Y-direction, and cylindrical guide posts 14 to 16 protruding from the base surface 12 in the positive Y-direction. The base surface 12 includes a recess 61 recessed in the negative Y-direction, and includes, above the recess 61, a recess 62 recessed more in the negative Y-direction than the recess 61. The base 10 includes a support shaft 63 extending from a bottom surface of the recess 62 in the positive Y-direction.

As shown in FIG. 2, the lever unit 50 includes a cylindrical rotor magnet 51 rotatably attached to the support shaft 63 in the base 10 and a lever 52 attached to the rotor magnet 51. The rotor magnet 51 includes a magnet with different magnetic poles in the circumferential direction. The rotor magnet 51 is received in the recess 62 on the base 10.

The lever 52 includes a lever body 53 rotatable about the support shaft 63 in the base 10 together with the rotor magnet 51, a cylindrical connector 54 extending from an end of the lever body 53 in the positive Y-direction, and protrusions 55 and 56 protruding from the lever body 53 in the positive Y-direction (frontward). The protrusion 55 is located adjacent to the support shaft 63 in the base 10 and extends circumferentially with a predetermined dimension. The protrusion 56 is located near a central portion of the lever body 53.

The coil unit 20 includes a yoke 21 formed from a magnetic material, a coil base 22, and a coil 23 wound around the yoke 21 and the coil base 22. The yoke 21 in the present embodiment is thin and flat in Y-direction. The yoke 21 is substantially U-shaped and includes two arms 24A and 24B. The coil 23 is wound around the arm 24A. The coil 23 is electrically connected to wiring in a flexible printed circuit board 71 extending along the periphery of the base 10. In the present embodiment, the coil unit 20 and the lever unit 50 are included in an actuator that moves the blade 40 in X-direction.

Figure 3:
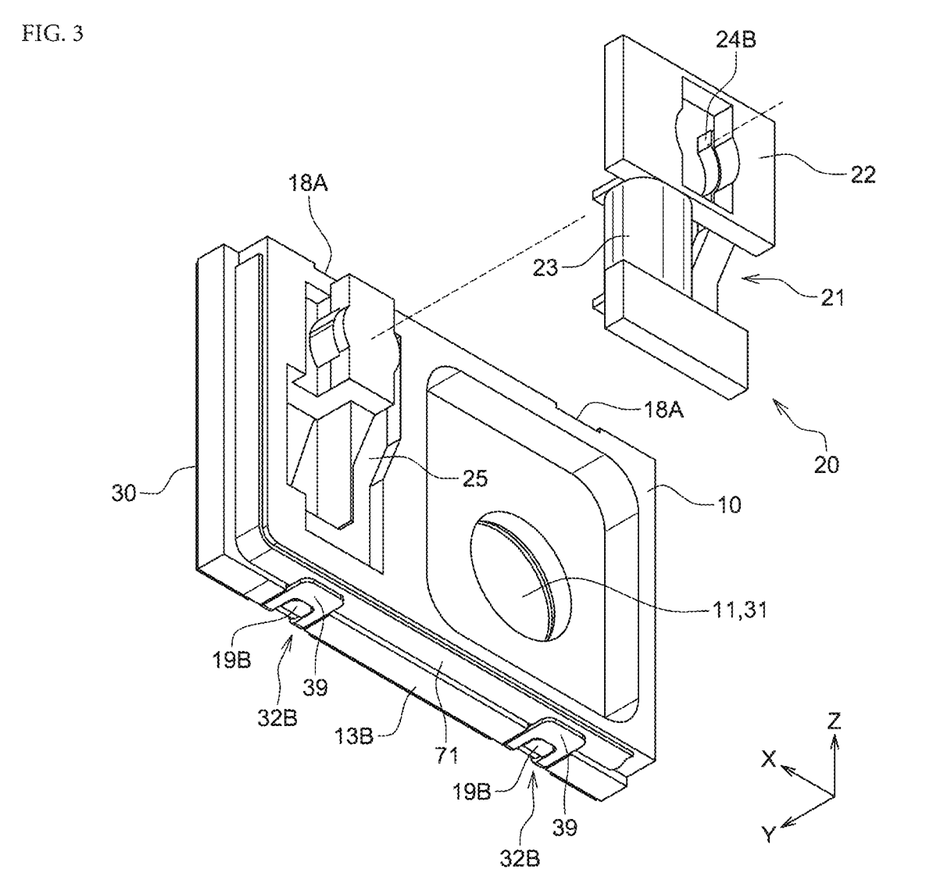
FIG. 3 is a rear exploded perspective view of the blade driving device in FIG. 1.

FIG. 3 is a rear exploded perspective view of the blade driving device 1 with the coil unit 20 removed from the base 10. As shown in FIG. 3, the base 10 has, on the rear face, a recess 25 for receiving the coil unit 20. Of the components of the actuator that moves the blade 40 in the present embodiment, the coil unit 20 including the yoke 21, the coil base 22, and the coil 23 is located behind the base 10, and the lever unit 50 including the rotor magnet 51 and the lever 52 is located in front of the base 10. The rotor magnet 51 received in the recess 62 on the base 10 is located between the arms 24A and 24B of the yoke 21 located behind the base 10.

The blade 40 has, in its upper portion, a guide groove 41 extending in X-direction, and has, in its lower portion, a guide groove 42 extending in X-direction. In the illustrated example, the lower guide groove 42 is longer than the upper guide groove 41. The guide groove 41 receives the guide post 14 on the base 10. The guide groove 42 receives the guide posts 15 and 16 on the base 10. The guide groove 41 on the blade 40 has a width in Z-direction slightly greater than the outer diameter of the guide post 14 on the base 10. The guide groove 42 on the blade 40 has a width in Z-direction slightly greater than the outer diameters of the guide posts 15 and 16 on the base 10. Thus, the guide post 14 on the base 10 is engaged with the guide groove 41 on the blade 40 in Z-direction, and the guide posts 15 and 16 on the base 10 are engaged with the guide groove 42 on the blade 40 in Z-direction. This allows the blade 40 to move in X-direction in which the guide grooves 41 and 42 extend.

The blade 40 has an elongated hole 43 extending in Z-direction. The elongated hole 43 receives the connector 54 in the lever 52. The connector 54 connects the lever body 53 in the lever 52 to the blade 40. The elongated hole 43 in the blade 40 has a width in X-direction slightly greater than the outer diameter of the connector 54 in the lever 52. Thus, the connector 54 in the lever 52 is engaged with the elongated hole 43 in the blade 40 in X-direction. As the lever 52 rotates about the support shaft 63 in the base 10, the connector 54 in the lever 52 engaged with the elongated hole 43 in X-direction moves the blade 40 in X-direction while moving inside the elongated hole 43 in the blade 40 in Z-direction.

As shown in FIGS. 1 and 2, the base 10 has, on the upper surface of the upper edge 13A, two recesses 18A slightly recessed in the negative Z-direction. The base 10 includes, in each of the recesses 18A, an upper engagement portion 19A protruding in the positive Z-direction. Similarly, as shown in FIG. 3, the base 10 has, on the lower surface of the lower edge 13B, two recesses 18B slightly recessed in the positive Z-direction. The base 10 includes, in each of the recesses 18B, a lower engagement portion 19B protruding in the negative Z-direction.

As shown in FIGS. 1 to 3, the cover 30 includes two upper hooks 32A in loops extending from the upper edge in the negative Y-direction and two lower hooks 32B in loops extending from the lower edge in the negative Y-direction. The upper hooks 32A correspond to the upper engagement portions 19A of the base 10. The lower hooks 32B correspond to the lower engagement portions 19B of the base 10. The upper hooks 32A and the lower hooks 32B are elastically deformable in Z-direction. Each looped upper hook 32A defines an internal space for receiving the corresponding upper engagement portion 19A of the base 10. Each looped lower hook 32B defines an internal space for receiving the corresponding lower engagement portion 19B of the base 10. As shown in FIG. 3, each lower hook 32B has an end in the negative Y-direction extending in the negative Y-direction. The end of each lower hook 32B serves as an extension 39. With the lower hooks 32B engaged with the lower engagement portions 19B of the base 10, the extensions 39 are located outside the flexible printed circuit board 71.

This structure allows the hooks 32A and 32B in the cover 30 to elastically deform in Z-direction and move over the engagement portions 19A and 19B of the base 10. The engagement portions 19A and 19B of the base 10 are thus engaged with the respective hooks 32A and 32B in the cover 30. This fixes the cover 30 to the base 10 (refer to FIGS. 1 and 3).

The guide post 14 on the base 10 extending in the positive Y-direction through the guide groove 41 on the blade 40 is received in a circular window 34 in the cover 30. Similarly, the guide posts 15 and 16 on the base 10 extending in the positive Y-direction through the guide groove 42 on the blade 40 are received in respective circular windows 35 and 36 in the cover 30. The connector 54 in the lever 52 extending in the positive Y-direction through the elongated hole 43 in the blade 40 is received in an arc-shaped window 37 in the cover 30.

Figure 4A:
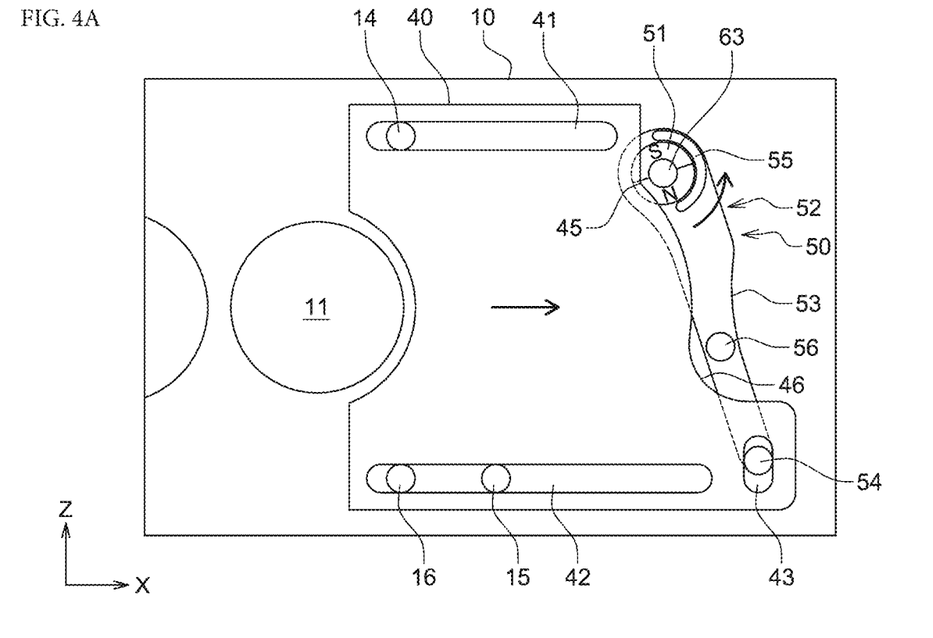
FIG. 4A is a schematic diagram of a blade at an opening position and a lever unit in the blade driving device in FIG. 1, describing their operations.
Figure 4B:
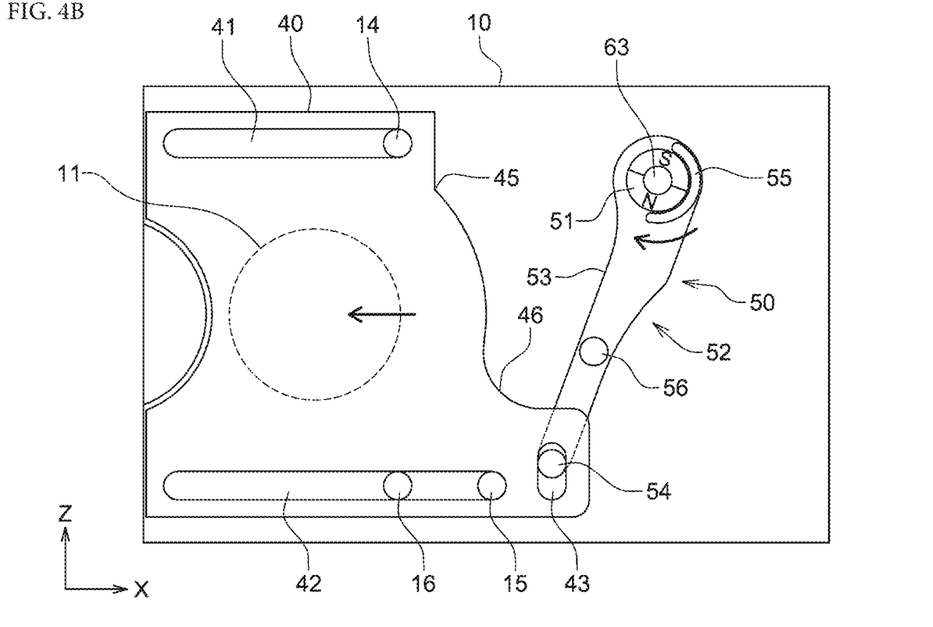
FIG. 4B is a schematic diagram of the blade at a closing position and the lever unit in the blade driving device in FIG. 1, describing their operations.

FIGS. 4A and 4B are schematic diagrams of the blade 40 and the lever unit 50, describing their operations. In the actuator described above, when the coil 23 in the coil unit 20 is energized with a current through the wiring in the flexible printed circuit board 71, the arms 24A and 24B of the yoke 21 are magnetically polarized (magnetized) oppositely to each other. The magnetic forces from the arms 24A and 24B attract and rotate the rotor magnet 51 in the lever unit 50.

When, for example, the coil 23 in the coil unit 20 is energized with a current flowing in one direction, the arms 24A and 24B of the yoke 21 that are magnetically polarized (magnetized) attract the magnetic poles of the rotor magnet 51 as shown in FIG. 4A, thus rotating the rotor magnet 51 counterclockwise. This rotates the lever 52 counterclockwise about the support shaft 63 in the base 10. As the lever 52 rotates counterclockwise about the support shaft 63, the connector 54 in the lever 52 engaged with the elongated hole 43 in the blade 40 moves the blade 40 in the positive X-direction. The blade 40 moves to a position at which the blade 40 does not overlap the opening 11 in the base 10 (and the opening 31 in the cover 30) to uncover the opening 11 in the base 10 (and the opening 31 in the cover 30). The position of the blade 40 in this state is hereafter referred to as an opening position.

When the coil 23 in the coil unit 20 is energized with a current flowing in a direction opposite to the direction of the current in FIG. 4A, the arms 24A and 24B of the yoke 21 are magnetically polarized (magnetized) oppositely to the state in FIG. 4A. The arms 24A and 24B thus attract the magnetic poles of the rotor magnet 51 as shown in FIG. 4B, thus rotating the rotor magnet 51 clockwise. This rotates the lever 52 clockwise about the support shaft 63 in the base 10. As the lever 52 rotates clockwise about the support shaft 63, the connector 54 in the lever 52 engaged with the elongated hole 43 in the blade 40 moves the blade 40 in the negative X-direction. The blade 40 moves to a position to cover the opening 11 in the base 10 (and the opening 31 in the cover 30). The position of the blade 40 in this state is hereafter referred to as a closing position.

When, for example, the blade 40 is at the opening position shown in FIG. 4A in an imaging device incorporating the blade driving device 1 as a shutter, light external to the blade driving device 1 enters an image sensor in the imaging device through the opening 31 in the cover 30 and the opening 11 in the base 10, thus allowing image capturing with the imaging device. When the blade 40 is at the closing position shown in FIG. 4B, the blade 40 blocks light external to the blade driving device 1 passing through the opening 31 in the cover 30.

Figure 5:
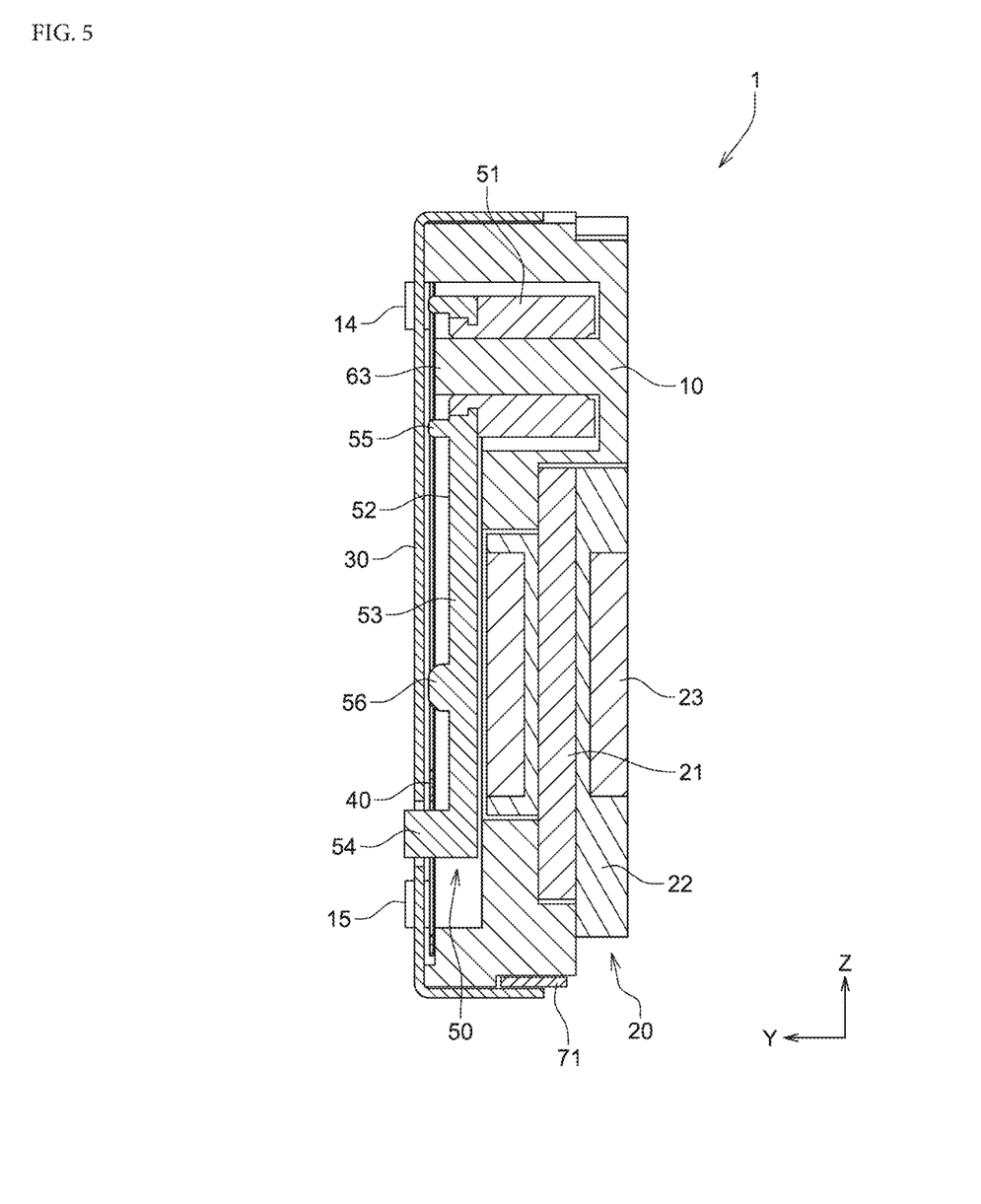
FIG. 5 is a longitudinal sectional view of the blade driving device in FIG. 1.

FIG. 5 is a longitudinal sectional view of the blade driving device 1. A known blade driving device includes a retainer plate (partition) between the blade 40 and the lever unit 50. The retainer plate retains the lever unit 50 in the recesses 61 and 62 on the base 10 to prevent the lever unit 50 from moving out of the recesses 61 and 62 on the base 10 under vibration or impact being applied. The blade driving device is thus thicker in Y-direction by the thickness of the retainer plate. In contrast, the blade driving device 1 according to the present embodiment can retain the lever unit 50 in the recesses 61 and 62 on the base 10 without such a retainer plate, and is thus thinner in Y-direction. More specifically, in the present embodiment, the protrusions 55 and 56 in the lever 52 protrude from the lever body 53 toward the cover 30 beyond the blade 40 in the positive Y-direction and face the cover 30, as shown in FIG. 5. The protrusions 55 and 56 in the lever 52 come in contact with the cover 30 under vibration or impact applied to the blade driving device 1, thus restricting movement of the lever 52 in Y-direction. The lever unit 50 can thus be retained in the recesses 61 and 62 on the base 10 without a component such as a retainer plate.

In the present embodiment, as described above, the lever unit 50 can be retained in the recesses 61 and 62 on the base 10 without a retainer plate used in a known structure. The blade driving device 1 thus includes fewer components and is thinner by the thickness of such a retainer plate.

Although the lever 52 in the present embodiment includes the two protrusions 55 and 56, the lever 52 may include one protrusion or three or more protrusions. To effectively restrict movement of the lever unit 50 in Y-direction, the structure may include, as the protrusion 55 in the present embodiment, a protrusion adjacent to the support shaft 63 in the base 10 that is the rotation center of the lever unit 50, or more specifically, a protrusion adjacent to the support shaft 63 in the base 10 and extending in the circumferential direction.

The protrusions 55 and 56 included in the lever 52 as in the present embodiment move and can come in contact with the blade 40 as the lever 52 rotates. To avoid such contact with the protrusions 55 and 56, the blade 40 may include contact-avoidance portions 45 and 46 that are defined by cutouts in the blade 40 (refer to FIGS. 4A and 4B).

Figure 6:
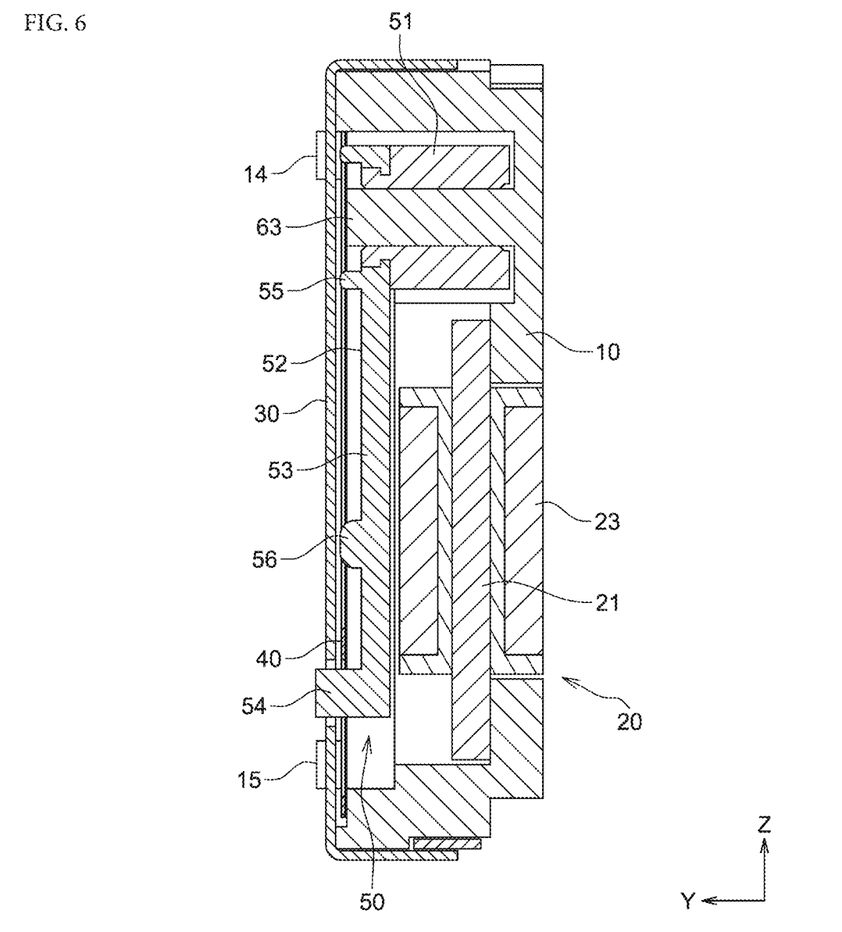
FIG. 6 is a longitudinal sectional view of a blade driving device according to another embodiment of the present invention.
Figure 7:
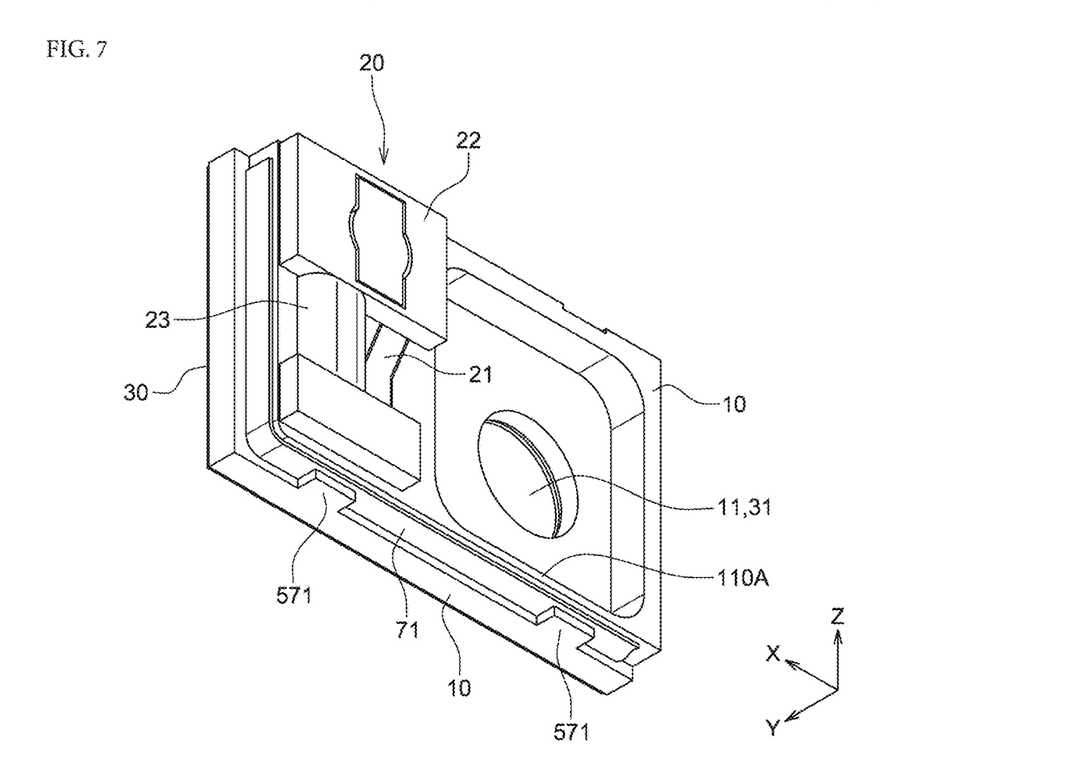
FIG. 7 is a rear perspective view of the blade driving device in FIG. 1 including known board holders.

Of the components of the actuator that moves the blade 40 in the present embodiment described above, the coil unit 20 is located behind the base 10, the lever unit 50 is located in front of the base 10, and the base 10 is located between the coil unit 20 and the lever unit 50. To further reduce the thickness of the blade driving device 1 in Y-direction, for example, both the lever unit 50 and the coil unit 20 may be located in front of the base 10 as shown in FIG. 6. Unlike the structure shown in FIG. 6, the structure shown in FIG. 5 includes the yoke 21 in the coil unit 20 held between the base 10 and the coil base 22, thus further increasing the stability and the design flexibility of the coil unit 20.

Referring back to FIG. 3, in the present embodiment, the flexible printed circuit board 71 including the wiring electrically connected to the coil 23 in the coil unit 20 extends in the negative Z-direction along a side surface of the base 10 and further in the negative X-direction along the lower edge of the base 10. The flexible printed circuit board 71 can loosen out of the blade driving device 1 for some reason. To prevent the flexible printed circuit board 71 from being out of the blade driving device 1, the base 10 may include board holders 571 that hold the flexible printed circuit board 71 from outside as shown in, for example, FIG. 7. The board holders 571 to be included in the base 10 without changing the size of the blade driving device 1 may cause other components (e.g., an inner wall 110A of the base 10 shown in FIG. 7) to be smaller by the size of the board holders 571. This can cause difficulty in designing the blade driving device 1. Further, the flexible printed circuit board 71 fixed with, for example, double-sided tape or an adhesive instead of the board holders 571 can involve higher material costs with the use of the double-sided tape or adhesive and also higher labor costs with an additional process for bonding.

In the present embodiment, as shown in FIG. 3, the lower hooks 32B in the cover 30 engaged with the lower engagement portions 19B of the base 10 include the extensions 39 located outside the flexible printed circuit board 71 to hold the flexible printed circuit board 71. This structure prevents the flexible printed circuit board 71 from being out of the blade driving device 1. The extensions 39 in the lower hooks 32B are thinner than the board holders 571 shown in FIG. 7 and thus can avoid affecting the smaller size of the blade driving device 1.

Figure 8:
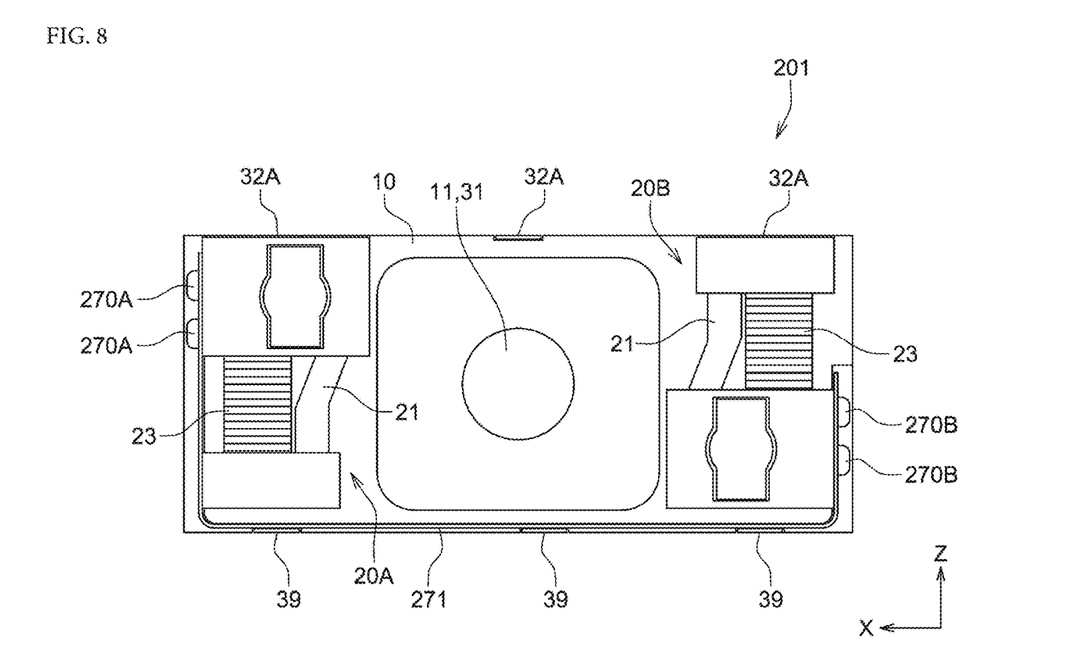
FIG. 8 is a rear view of a blade driving device according to another embodiment of the present invention.

For example, a blade driving device 201 including two actuators shown in FIG. 8 may advantageously include such extensions 39. The blade driving device 201 shown in FIG. 8 includes two coil units 20A and 20B, two lever units (not shown), and a flexible printed circuit board 271 connected to the two coil units 20A and 20B. The coil 23 in the coil unit 20A is electrically connected to a circuit in the flexible printed circuit board 271 with solder 270A. The coil 23 in the coil unit 20B is electrically connected to the circuit in the flexible printed circuit board 271 with solder 270B. In this structure, the flexible printed circuit board 271 is to be connected across the two coil units 20A and 20B and thus to be located along the periphery of the base 10. The structure including the extensions 39 described above can effectively hold the flexible printed circuit board 271 without increasing the size of the blade driving device 201.

Although the blade 40 slides in one direction with the actuator in the above embodiment, the actuator is not limited to this structure. For example, an actuator including a lever unit 350 shown in FIG. 9 may be used to rotate a blade 340 about a support shaft 342.

Figure 9:
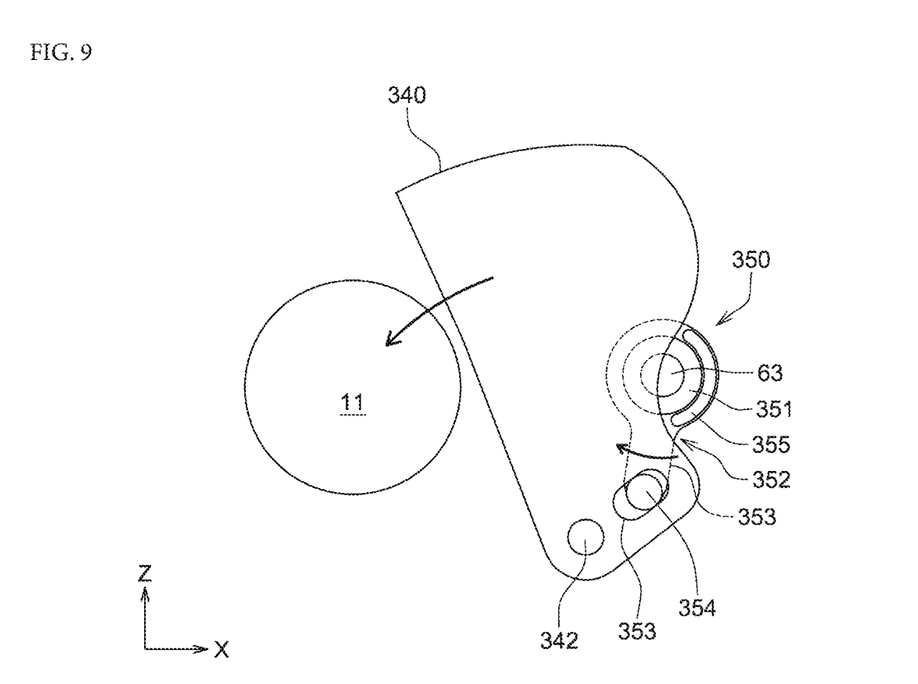
FIG. 9 is a schematic diagram of a blade and a lever unit in another embodiment of the present invention, describing their operations.

The lever unit 350 includes a cylindrical rotor magnet 351 rotatably attached to the support shaft 63 in the base 10 and a lever 352 attached to the rotor magnet 351. The lever 352 includes a lever body 353 rotatable about the support shaft 63 in the base 10 together with the rotor magnet 351, a cylindrical connector 354 extending from an end of the lever body 353 in the positive Y-direction, and a protrusion 355 located adjacent to the support shaft 63 and protruding in the positive Y-direction (frontward). The connector 354 in the lever 352 is received in and engaged with an elongated hole 343 in the blade 340. In this structure, when the lever 352 rotates about the support shaft 63 in the base 10 as the rotor magnet 351 rotates, the connector 354 in the lever 352 engaged with the elongated hole 343 in the blade 340 causes the blade 340 to rotate about the support shaft 342 and move between the closing position to cover the opening 11 in the base 10 (and the opening 31 in the cover 30) and the opening position to uncover the opening 11.

Figure 10:
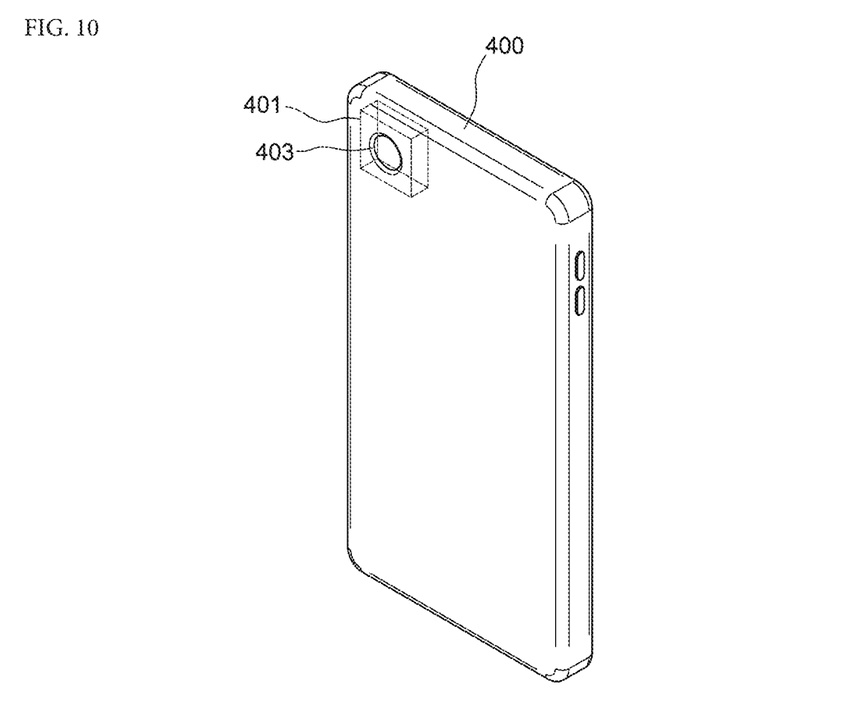
FIG. 10 is a perspective view of a smartphone as an example electronic device incorporating a blade driving device according to one or more embodiments of the present invention.

A smartphone 400 shown in FIG. 10 is an example electronic device incorporating the blade driving device 1 or 201 described in the above embodiments. The smartphone 400 incorporates an imaging device 401 including the blade driving device 1 or 201 described above. The smartphone 400 has, in its back surface, a window 403 to allow light to enter a lens in the imaging device 401. In this structure, for example, the blade driving device 1 or 201 described above can be used as a shutter, a barrier, or an aperture for the imaging device 401. A filter blade and an aperture blade in addition to a shutter blade can be used as the blade 40 in accordance with the use of the blade driving device 1.

The blade driving device according to one or more embodiments of the present invention may be used not only in the smartphone 400 but also in various other electronic devices, such as tablet computers, laptop computers, smart speakers, drones, monitoring cameras, and in-vehicle cameras.

The blade driving device 1 or 201 described above can also be used as a shutter (also referred to as a cover or a lid) for shielding against image capturing with a camera when unintended by the user. In this case, the blade 40 or 340 may partially block light entering the image sensor in the imaging device through the openings 11 and 31, rather than fully blocking light entering the image sensor. To partially block light entering the image sensor, for example, the blade 40 or 340 may be formed from a material having a low transmittance to light to be captured by the image sensor (e.g., visible light and infrared light), may be colored, or may be patterned with irregularities or holes (e.g., a reticulated or grid pattern and a concentric circle pattern). This causes images or videos captured with the image sensor to be partly unclear or invisible, thus preventing images or videos unintended by the user from being obtained. The blade 40 or 340 may have a predetermined optical effect (e.g., a mosaic filter, scattering, and diffuse reflection) to light entering the image sensor through the openings 11 and 31. This also causes images or videos captured with the image sensor to be partly unclear or invisible, thus preventing images or videos unintended by the user from being obtained.

Although the embodiments of the present invention have been described above, the present invention is not limited to the above embodiments and may be modified variously within the scope of its technical idea.

As described above, a blade driving device according to a first aspect of the present invention is smaller and has fewer components. The blade driving device includes a base including a support shaft extending frontward, a cover having an opening, a blade located in a blade chamber defined between the base and the cover, and an actuator that moves the blade between a closing position to cover the opening and an opening position to uncover the opening. The cover covers a front of the base. The actuator includes a lever connected to the blade. The lever in the actuator includes a lever body rotatable about the support shaft in the base, a connector connecting the lever body and the blade, and at least one protrusion protruding from the lever body frontward beyond the blade and facing the cover.

In this structure, the at least one protrusion in the lever comes in contact with the cover under vibration or impact applied to the blade driving device, thus restricting movement of the lever in the front-rear direction. The lever can thus be retained between the base and the cover without a component such as a retainer plate between the lever body and the cover. This eliminates a retainer plate included in a known structure to retain the lever between the base and the cover. The blade driving device thus includes fewer components and is thinner by the thickness of the retainer plate.

To effectively restrict movement of the lever in the front-rear direction, the at least one protrusion in the lever may be located adjacent to the support shaft in the base and extend in a circumferential direction.

The blade may include a contact-avoidance portion to avoid contact with the at least one protrusion in the lever.

The actuator may further include a rotor magnet rotatably attached to the support shaft in the base and attached to the lever, a yoke located to magnetically act on the rotor magnet, and a coil wound around a part of the yoke. The blade driving device including the actuator is compact.

The lever and the rotor magnet may be located in front of the base, and the coil and the yoke may be located behind the base. This structure including the coil and the yoke located opposite to the lever and the rotor magnet causes the yoke to be held between, for example, a base and a coil base, thus increasing the stability and the design flexibility of the blade driving device.

The lever, the rotor magnet, the coil, and the yoke may be located in front of the base. This structure including the lever, the rotor magnet, the coil, and the yoke located on one surface of the base can further reduce the thickness of the blade driving device in the front-rear direction.

The blade driving device may further include a flexible printed circuit board extending along a periphery of the base. The flexible printed circuit board may include wiring electrically connected to the actuator inside. In this case, the base may include a plurality of engagement portions on an outer peripheral surface of the base, and the cover may include a plurality of hooks engageable with the plurality of engagement portions of the base. At least one of the plurality of hooks may include an extension to be located outside the flexible printed circuit board when the plurality of hooks are engaged with the plurality of engagement portions of the base. In this structure, with the hooks in the cover engaged with the engagement portions of the base, the extensions in the hooks are located outside the flexible printed circuit board and can thus hold the flexible printed circuit board. This compact structure prevents the flexible printed circuit board from being out of the blade driving device.

An imaging device according to a second aspect of the present invention is smaller and has fewer components. The imaging device includes the blade driving device described above, and an image sensor that receives light entering through the opening in the cover in the blade driving device.

An electronic device according to a third aspect of the present invention is smaller and has fewer components. The electronic device includes the imaging device described above.

What is claimed is:

1. A blade driving device, comprising:
   a base including a support shaft extending frontward;
   a cover covering a front of the base, the cover having an opening;
   a blade located in a blade chamber defined between the base and the cover; and
   an actuator configured to move the blade between a closing position to cover the opening and an opening position to uncover the opening, the actuator including a lever connected to the blade,
   wherein the lever in the actuator includes
      a lever body rotatable about the support shaft in the base,
      a connector connecting the lever body and the blade, and
      at least one protrusion protruding from the lever body frontward beyond the blade and facing the cover, wherein the at least one protrusion in the lever is located adjacent to the support shaft in the base and extends in a circumferential direction.

2. The blade driving device according to claim 1, wherein the blade includes a contact-avoidance portion to avoid contact with the at least one protrusion in the lever.

3. The blade driving device according to claim 1, wherein the actuator further includes
   a rotor magnet rotatably attached to the support shaft in the base and attached to the lever,
   a yoke located to magnetically act on the rotor magnet, and
   a coil wound around a part of the yoke.

4. The blade driving device according to claim 3, wherein the lever and the rotor magnet are located in front of the base, and the coil and the yoke are located behind the base.

5. The blade driving device according to claim 3, wherein the lever, the rotor magnet, the coil, and the yoke are located in front of the base.

6. The blade driving device according to claim 1, further comprising:
   a flexible printed circuit board extending along a periphery of the base, the flexible printed circuit board including wiring electrically connected to the actuator, wherein the base includes a plurality of engagement portions on an outer peripheral surface of the base, and
   the cover includes a plurality of hooks engageable with the plurality of engagement portions of the base, and at least one of the plurality of hooks includes an extension to be located outside the flexible printed circuit board when the plurality of hooks are engaged with the plurality of engagement portions.

7. An imaging device, comprising:
   the blade driving device according to claim 1; and
   an image sensor configured to receive light entering through the opening in the cover in the blade driving device.

8. An electronic device, comprising:
   the imaging device according to claim 7.

* * * * *